(No Model.)
J. T. PARLOUR.
Excavating and Dredging Machinery.
No. 235,563. Patented Dec. 14, 1880.
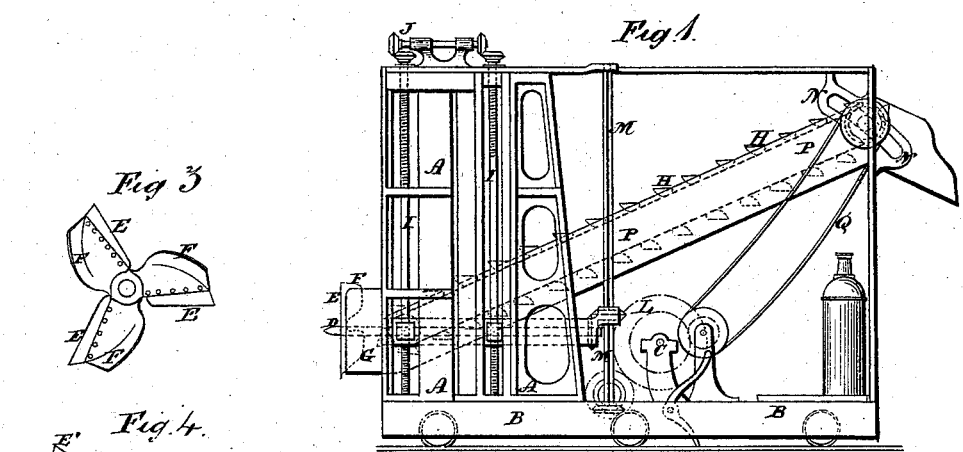
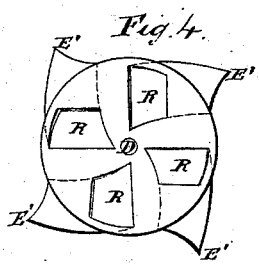
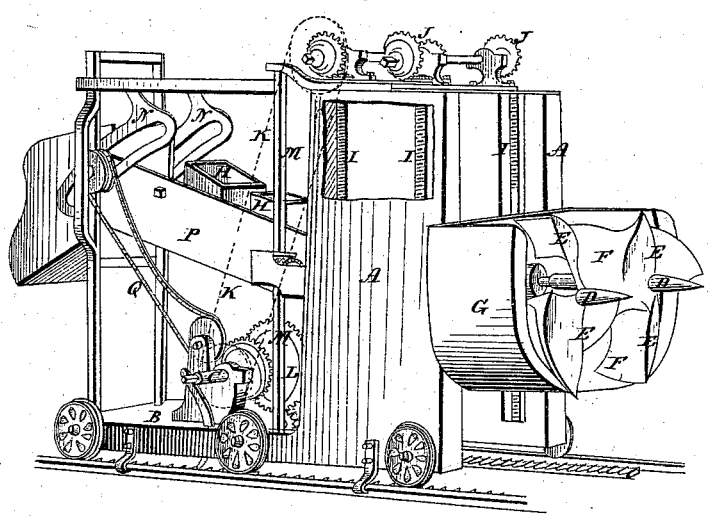
Attest:
J. A. Rutherford
J. Henry Kaiser
Inventor:
Joseph Thomas Parlour
By James L. Norris
Atty.

UNITED STATES PATENT OFFICE.

JOSEPH T. PARLOUR, OF LONDON, ENGLAND.

EXCAVATING AND DREDGING MACHINERY.

SPECIFICATION forming part of Letters Patent No. 235,563, dated December 14, 1880.

Application filed October 27, 1880. (No model.) Patented in England October 17, 1879.

*To all whom it may concern:*

Be it known that I, JOSEPH THOMAS PARLOUR, a subject of the Queen of Great Britain, residing at London, England, have invented new and useful Improvements in Excavating and Dredging Machinery, (for which I have obtained a patent in Great Britain, No. 4,216, bearing date October 17, 1879,) of which the following is a specification.

For the purposes of my invention I mount one or more rotatory scoops or other tools upon shafts arranged in a traveling frame, that they may be moved up or down to the material as the work progresses. The scoops are so arranged that the material moved by them may slide to the rear out through apertures provided for that purpose onto a receiver, and from thence by buckets of a traveling chain, to enable the material to be shot into vehicles or otherwise.

Figure 1 represents a side elevation, and Fig. 2 a perspective view, of my excavating or dredging machine mounted upon wheels, that it may be moved upon rails and held temporarily in a fixed position by pawls dropping into teeth at the side of the rails. Fig. 3 is a detached front view of one of the rotary scoops, and Fig. 4 is a rear view of a modification thereof.

The machine consists of two upright frames, A A, which may be hollow, and serve as water-tanks to feed an engine, which may be carried upon the bed-plate B, that the main rotating shaft C may be driven direct, if desired.

D D are shafts, carrying at their outer ends excavating-scoops with cutting-edges E E, as in the face view, Fig. 3, and in detached front view of the modification, Fig. 4.

The back portion, F F, of the rotating scoops are inclined, to direct the earth to the rear of the blades, from whence it falls into the receiver G, to be in position to be lifted by traveling buckets H H, mounted upon endless chains, in a manner well known.

The shafts D D are carried by blocks guided by and sliding in slots of the uprights A A under the action of threaded shafts I I, which are rotated by gear J J from above through a chain, K, (shown in dotted lines in Fig. 2,) from the shaft C.

The shafts of the two excavating-scoops are rotated in opposite directions by means of bevel-gears fixed upon the rear ends of said shafts, and meshing with similar gears arranged to slide on the square vertical shafts M, which are driven by suitable intermediate connections with spur-wheel L. The endless chain of buckets H is carried at the front by a drum journaled upon the vertically-adjustable blocks, and at the rear by a drum the bearings of which are in curved guides N N, which permit them to adjust themselves to the varying positions which the frame P assumes as the scoops are raised and lowered.

Q is a chain communicating motion to the rear drum of the endless chain of buckets.

In Fig. 3 I have shown the scoop with detachable cutting-edges plain; but they may be serrated or formed with teeth, or may have diamonds set in, especially when hard minerals have to be operated upon.

The modified form of excavating-scoop shown in Fig. 4 consists of a disk provided with cutters E', projecting beyond its periphery, and secured to its face on the dotted lines, as shown in the drawings. In rear of the inner portions of the cutters are formed apertures R in the disk, whence the earth removed by the cutters may fall into the receiver. This form of excavating-scoop is preferable for use where earth is to be removed from below the level of the machine, or when the sides of a canal are to be operated upon.

I claim as my invention—

1. The novel combination of frames A A, rising and lowering gear J J, endless chain of buckets H H, quadrants N N, and rotating excavating-scoops E, working in opposite directions, substantially in the manner and for the purposes described.

2. The combination, with the vertically-adjustable rotary excavating-scoops, of the endless chain of buckets arranged for adjustment in correspondence with said scoops, substantially as described.

In witness whereof I have hereunto signed my name in the presence of two subscribing witnesses.

JOSEPH THOMAS PARLOUR.

Witnesses:
HENRY GARDNER,
RICHARD CORE GARDNER.